United States Patent [19]
Schlegel

[11] 3,879,793
[45] Apr. 29, 1975

[54] ANTI-WINDLIFT LOW PROFILE WINDSHIELD WIPER BLADE

[75] Inventor: Paul D. Schlegel, Boulder, Colo.

[73] Assignee: The Gates Rubber Company, Denver, Colo.

[22] Filed: Jan. 24, 1974

[21] Appl. No.: 436,276

[52] U.S. Cl. .......................... 15/250.42; 15/250.20
[51] Int. Cl. .............................................. B60s 1/38
[58] Field of Search ....... 15/250.20, 250.42, 250.35, 15/250.36

[56] References Cited
UNITED STATES PATENTS

| 2,616,113 | 11/1952 | Scinta | 15/250.42 |
| 2,792,586 | 5/1957 | Chambers | 15/250.42 |
| 3,317,946 | 5/1967 | Anderson | 15/250.42 |
| 3,348,257 | 10/1967 | Hadekel | 15/250.42 |
| 3,390,417 | 7/1968 | Kohler et al. | 15/250.42 |
| 3,673,631 | 7/1972 | Yamadai et al. | 15/250.42 |

FOREIGN PATENTS OR APPLICATIONS

| 1,416,851 | 8/1965 | France | 15/250.42 |

*Primary Examiner*—Peter Feldman
*Attorney, Agent, or Firm*—Curtis H. Castleman, Jr.; Raymond Fink; H. W. Oberg, Jr.

[57] ABSTRACT

A combination low silhouette anti-windlift wiper blade is described in which the superstructure comprises a pair of secondary yokes pivotally connected at their ends in cantilever fashion to a central primary yoke which has a solid cross-section and whose top surface is inclined with respect to the wiping surface in a manner to counteract any lifting forces created by wind.

6 Claims, 7 Drawing Figures

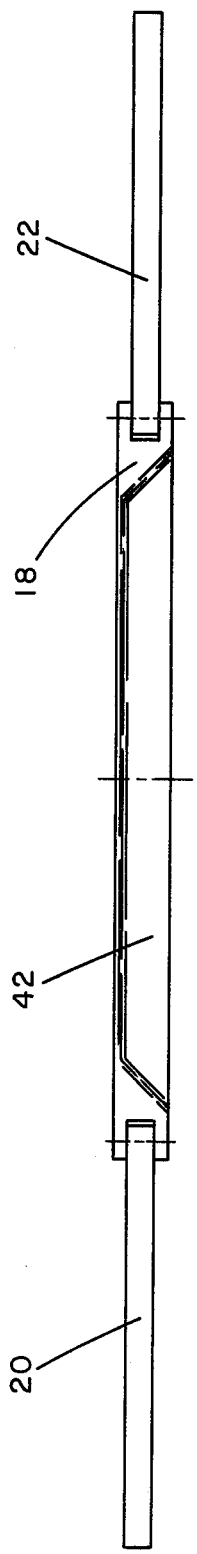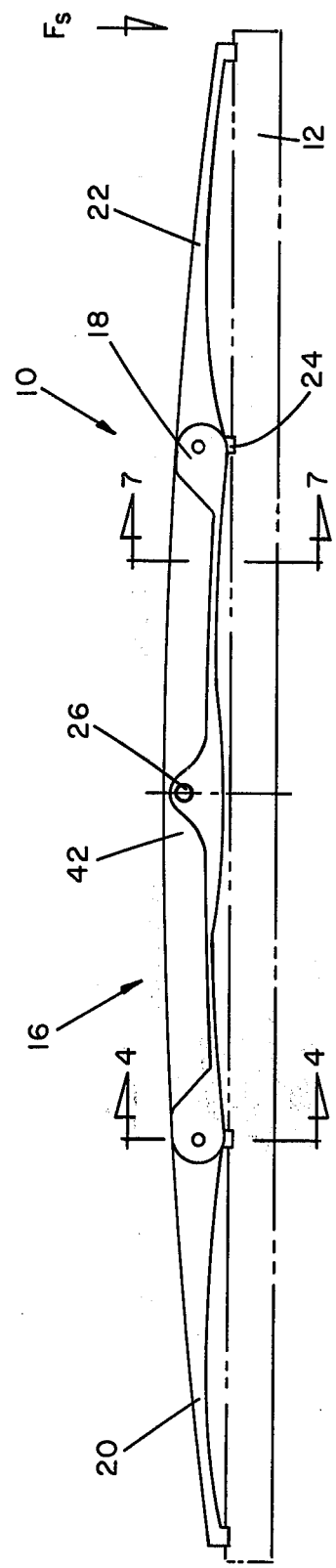
FIG. 2
FIG. 1

ANTI-WINDLIFT LOW PROFILE WINDSHIELD WIPER BLADE

BACKGROUND OF THE INVENTION

This invention pertains to windshield wipers which are of low profile also having anti-windlift characteristics, and preferably relates to windshield wipers so constructed in which at least a portion of the load or pressure-distributing superstructure is fabricated of a plastic material.

There has been increased use of hidden recesses in the cowls of automobiles for concealing windshield wiper blades when in the parked position. These recesses are so dimensioned that only low profile or low silhouette blades can be accommodated. Many of the plastic blades presently being offered commercially fail to fit in the recesses because of a high profile inherent in single piece molded superstructure design.

It is also known that under certain adverse conditions windshield wipers are subject to wind-lift whereby the wiping characteristics of the blade are compromised, usually evidenced by streaking across the wiping surface. Various configurations have been proposed in the past to minimize wind-lift, including the use of fins or vanes, bifurcated tilting metal strip yokes, airfoils, and yokes pierced with a plurality of holes. While these proposed configurations have had more or less success when used in conjunction with blades having superstructures formed of metal strips or channel, heretofore no satisfactory solution to avoid wind-lift has been proposed for plastic blades having a portion of all of the superstructure fabricated of molded plastic or the like. Unfortunately, most of the proposed solutions to the wind-lift problem include raising the overall silhouette of the blade, to the extent that these blades will not fit in the recesses of the cowls of many automobiles.

U.S. Pat. No. 3,317,946, in the name of J. W. Anderson, teaches that the distance between the bottom of his airfoil-like primary yoke and the surface to be wiped must be at least about 1 inch in order that the airfoil is impinged by a layer of more freely moving air which is above the relatively static boundary layer of air adjacent the windshield. The patent teaches that the higher the silhouette, the better the anti-windlift characteristics of the blade. Additional references exhibiting the state of the art includes: U.S. Pat. Nos. 2,706,291 (Rattl); 2,794,203 (Oishei); 3,876,478 (Wallis); 3,224,028 (Peras et al.); 3,348,257 and 3,386,126 (Hadekel); 3,390,417 (Kohler et al.); and 3,673,631 Yamadai et al.

It is a primary object of the present invention to provide a windshield wiper blade fabricated at least in part of a plastic material, which has a very low silhouette and at the same time has significantly improved anti-windlift characteristics over what is previously known.

SUMMARY OF THE INVENTION

Briefly described, the invention includes a windshield wiper blade having the usual elastomeric wiping element, a backing member for retention of the wiping element, and a pressure-distributing superstructure of low profile and anti-windlift configuration, the superstructure operatively engaging the backing member at a plurality of points therealong. The improved superstructure comprises a primary yoke fabricated of plastic having a top surface having a ramp portion forming an acute angle with respect to a plane extending substantially parallel to the surface to be wiped; a pair of cantilevered secondary yokes each having an inboard end portion pivotally connected to one end of the primary yoke forming therewith an articulated low profile superstructure; and, spring means associated with the pivotal connections between the primary and secondary yokes urging the secondary yokes toward the surface to be wiped.

BRIEF DESCRIPTION OF THE DRAWINGS

Description of certain preferred embodiments of the invention will be made with reference to the accompanying drawings, in which:

FIG. 1 represents a side elevational view of a windshield wiper according to the invention as it would appear when wiping a flat surface;

FIG. 2 is a plan view of the wiper of FIG. 1;

PREFERRED EMBODIMENTS OF THE INVENTION

Figure 4:
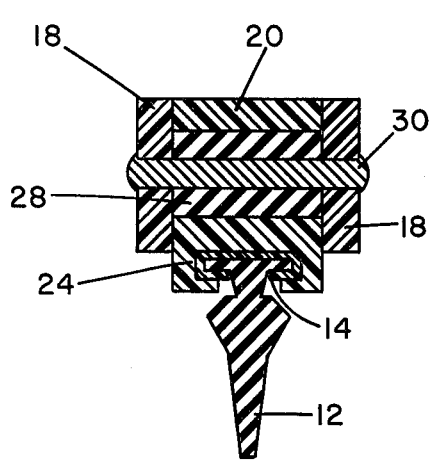
FIG. 4 is a view taken along section 4—4 of FIG. 1.

Referring to the drawings, a wiper assembly which may be used in conjunction with the windshield of an automobile, for instance, is generally shown at 10. The blade includes a wiping element 12 or squeegee of an elastomeric material held in operative position by a squeegee retention member or backing element 14 which, together with the squeegee have flexibility for conformance with acutely curved windshields as well as planar surfaces to be wiped. Pressure is applied to the squeegee and backing member combination through a pressure-distributing linkage or superstructure generally designated at 16 comprising a centrally disposed primary yoke 18 and a pair of cantilevered secondary yokes 20, 22.

The superstructure is slidably engaged with the backing member and squeegee through a plurality (four shown in FIG. 1) of straddle hooks or claws 24 which loosely engage the backing strip 14, permitting translatory motion therebetween. Releasable stop means (not shown) are provided to prevent disengagement between the squeegee and backing member, and backing member and superstructure, respectively.

The wiper assembly is made to conform against the windshield surface in conventional manner through a wiper arm (not shown) connected preferably through a side arm pin connection which engages with the primary yoke through port 26. The side arm connector is preferred since it does not increase the overall height of the blade.

Figure 5:
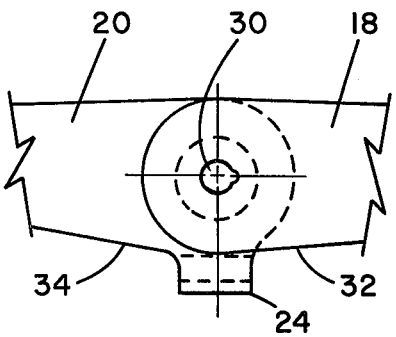
FIG. 5 is an enlarged view of the pivotal connection between the primary yoke and a secondary yoke.
Figure 3:
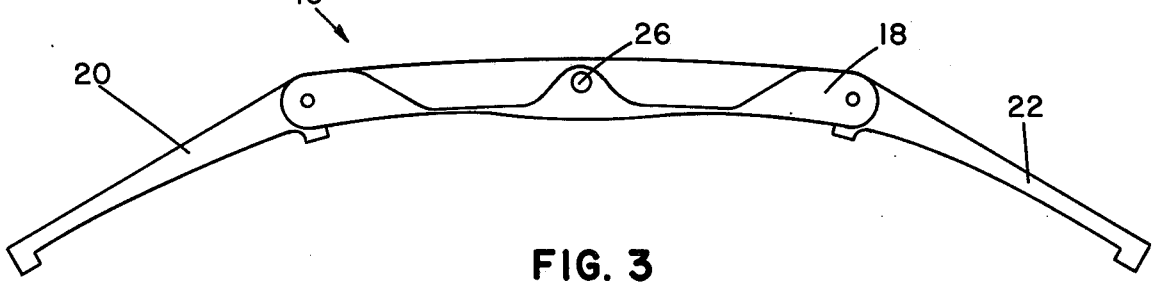
FIG. 3 shows the superstructure of FIG. 1 in the unloaded position.

The manner in which the primary yoke is connected to the inboard portions of the respective secondary yoke permits a very low profile configuration without detracting from the ability of the wiper blade to bend around curved windshields. Referring to FIGS. 4 and 5, one form of connection is shown in which the spring means associated with the primary yoke 18 and secondary yokes 20, 22 consists of a rubber torsion spring 28 connected to each of the yokes, such as by bonding with an adhesive, and concentric with a journaled pivot pin 30. The rubber torsion spring and pin pivot is connected so that in the unloaded position, as shown in FIG. 3, the outboard ends of the secondary yokes 20, 22 are deflected and urged toward the surface to be wiped. Thus, in the loaded position of FIG. 1 the outboard ends of the secondary yokes will apply a force $F_s$ which is determined by the overall force applied by the wiper arm and the tension of the torsion spring means. The characteristics (e.g. spring constants) of each of the torsion springs at the respective pivot points between the primary and secondary yokes may be the same or chosen differently to permit selective flexibility in loading at each of the straddle hooks 24 carried by the superstructure.

It is preferred that each of the two inner straddle hooks 24 be positioned substantially directly below the pivot area, shown in FIG. 5, to permit maximum pivot angle between the respective yokes before the backing member 14 abuts against the underside 32, 34 of the yokes; in this manner a very low silhouette configuration is maintained. In contrast, former designs using a cantilever type connection between the yokes employed an extended connection portion between the claw or hook members and the bottom of the pivot area, thereby comprimising the pivoting angle for a given profile. The straddle hooks at the pivot area may be connected either to the primary or secondary yoke.

Figure 6:
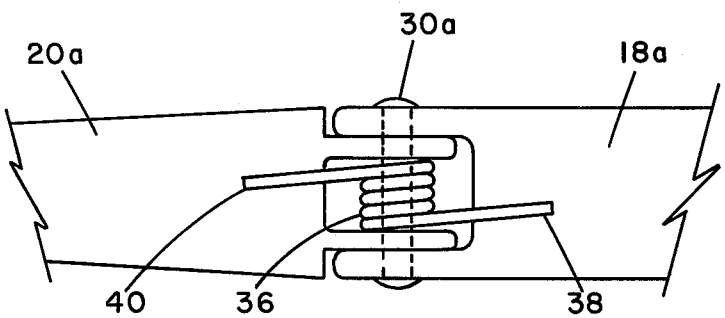
FIG. 6 is a plan view depicting an alternative spring means for connecting a primary yoke with a secondary yoke.

Referring to FIG. 6, an alternative spring means for pivotally connecting primary yoke 18a with secondary yoke 20a through pin 30a is shown. In this embodiment, a torsion metal spring 36 applies torque to the secondary yoke in a similar manner as provided by the rubber torsion spring in the embodiment of FIG. 4. The ends of the spring 38 and 40 bear, respectively, on the top surfaces of the primary and secondary yokes to urge the latter against the surface to be wiped. Various other biasing means other than metal springs or rubber springs may be used as desired.

It is preferred that both the undersurfaces of the primary yoke 18 and secondary yokes 20, 22 are concave as shown, the curvature permitting unobstructed flexing of the blade about acutely curved surfaces.

In addition to the low silhouette feature of the wiper blade of the subject invention, the combination includes the anti-windlift configuration built into the superstructure without the need for separate airfoil attachments commonly used in the past. The anti-windlift feature is provided by forming a ramp portion in the primary yoke and optionally in either or both of the secondary yokes, the ramp being inclined toward the windward side of the blade so as to provide a reactive surface to the wind. This ramp portion forms an acute angle with respect to a plane extending substantially parallel to the surface to be wiped. As an example, referring to FIG. 7, primary yoke 18 has an inclined ramp 42, an extension or tangent to which forms an angle $\theta$ with the windshield surface as shown. While the ramp has been shown to be essentially a flat surface, a slightly convex or concave surface will also serve the intended purpose of providing a force component $F_w$ under the action of the wind which will negate lifting effects on the blade. In this manner the inclined surface of the primary yoke reacts to yield a force normal to the windshield to maintain its conformance therewith.

Figure 7:
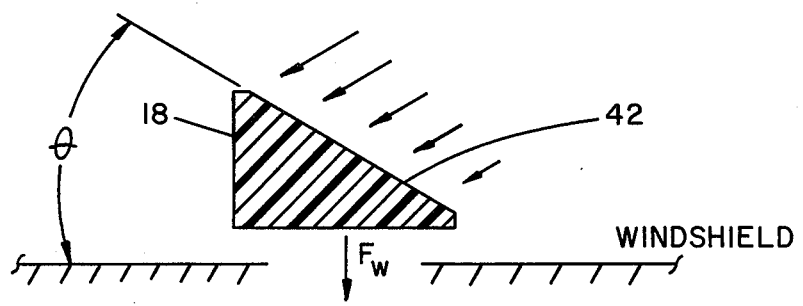
FIG. 7 is a view taken along section 7—7 of FIG. 1 showing only the primary yoke.

Contrary to the prior art teaching and particularly the aforementioned disclosure of the Anderson patent, it is possible to combine a low silhouette structure and simultaneously provide it with anti-windlift quality. The Anderson patent states that his reactive surface or airfoil must be at least one inch above the surface of the windshield to be wiped so as to penetrate the higher wind currents and at the same time to avoid the "relatively static boundary layer of air adjacent the windshield." Contrary to this teaching, at least with respect to molded plastic superstructures having substantially solid cross sections, it is quite permissible to lower the profile of the blade and penetrate this relatively static boundary layer of air near the windshield. In fact, the closer one gets to the surface of the windshield, the lower the wind force (as represented in FIG. 7 by shorter arrows) and hence the less the tendency to experience the windlift phenomenon. By staying close to the windshield it is not necessary to have abruptly curved inclined ramps nor is it necessary to provide upturned end extremities as taught by the aforementioned Anderson patent, inter alia. The simple flat ramp 42 shown in FIG. 7 is satisfactory to prevent windlift, and only the single ramp rather than two ramps as taught in the art is required. However, if desired, an additional ramp on the other side of the yoke could be employed either symmetrical or non-symmetrical with respect to the other ramp.

The inclined ramp forming the top surface of the superstructure, without the low silhouette design above described, is insufficient in itself to fully buffer the effect of the wind, and vice versa. In general, in the blade of the subject invention the underside of the primary yoke is less than about three-fourths inch from the surface to be wiped, and more preferably is less than about five-eighths inch to such surface when in an operative position, although the windshield and hood designs will in part dictate the clearance criteria.

Another advantage of the invention is enabled by the low profile configuration of the blade. In the case of plastic superstructures, a fairly large clevis is required at the location of the pivots between the primary and secondary yokes to provide the strength needed to reduce the possibility of stress cracking at the joint. Since the overall wiper blade of the invention has such a low profile a fairly large clevis may be utilized and still provide clearance with respect to the cowl of the automobile in the hidden wiper recess.

It should be understood that the invention is capable of a variety of modifications and variations which will be made apparent to those skilled in the art by a reading of the specification and which are to be included within the spirit of the claims appended hereto.

What is claimed is:

1. In a windshield wiper having an elastomeric wiping element secured to a backing member, and a pressure-distributing superstructure having means engaging the backing member at a plurality of points therealong, an improved low silhouette anti-windlift superstructure comprising:

a primary yoke fabricated of plastic of solid cross-section and having a top surface having a ramp portion forming an acute angle with respect to a plane extending substantially parallel to the surface to be wiped;

a pair of cantilevered secondary yokes each having an inboard end portion pivotally connected to one end of the primary yoke forming therewith an articulated low profile superstructure; and spring means associated with the pivotal connections between the primary and secondary yokes urging the secondary yokes toward the backing member and the surface to be wiped;

said means for engaging the superstructure and backing member comprising a plurality of straddle hooks permitting a sliding engagement therebetween and wherein at least one inwardly disposed straddle hook is positioned substantially directly below the area of said pivotal connection between the primary yoke and a secondary yoke.

2. The windshield wiper of claim 1 wherein the ends of each of the respective yokes are mounted directly on or immediately adjacent to the backing member.

3. The windshield wiper of claim 2 wherein each of the primary and secondary yokes have a concave undersurface having a curvature which permits flexing of the blade about acutely curved surfaces.

4. The windshield wiper of claim 1 wherein the ramp portion is substantially flat and is formed on only one side of the primary yoke, defining a primary yoke having a substantially right triangular cross-section.

5. The windshield wiper of claim 1 wherein the spring means associated with the pivotal connections consist of rubber torsion springs connected at each pivot respectively to the primary and secondary yokes.

6. The windshield wiper of claim 1 wherein the spring means consists of a metal torsion spring.

* * * * *